United States Patent
Chimura et al.

(10) Patent No.: US 11,033,036 B2
(45) Date of Patent: Jun. 15, 2021

(54) CLAMPING DEVICE FOR BONE-IN LIMB MEAT, LOADING DEVICE FOR BONE-IN LIMB MEAT, AND CLAMPING METHOD FOR BONE-IN LIMB MEAT

(71) Applicant: MAYEKAWA MFG. CO., LTD., Tokyo (JP)

(72) Inventors: Takeshi Chimura, Tokyo (JP); Hiroyuki Usui, Tokyo (JP); Takekuni Umehara, Tokyo (JP); Osamu Goto, Tokyo (JP); Hajime Akabane, Tokyo (JP); Yuuichi Kuratani, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 244 days.

(21) Appl. No.: 16/463,082

(22) PCT Filed: Oct. 5, 2018

(86) PCT No.: PCT/JP2018/037374
§ 371 (c)(1),
(2) Date: May 22, 2019

(87) PCT Pub. No.: WO2020/070875
PCT Pub. Date: Apr. 9, 2020

(65) Prior Publication Data
US 2021/0100257 A1   Apr. 8, 2021

(51) Int. Cl.
*A22C 17/00* (2006.01)
*A22C 15/00* (2006.01)
*F16B 2/10* (2006.01)

(52) U.S. Cl.
CPC .......... *A22C 17/0093* (2013.01); *A22C 15/00* (2013.01); *F16B 2/10* (2013.01)

(58) Field of Classification Search
CPC .......................... A22C 17/0093; A22C 15/00
(Continued)

(56) References Cited

U.S. PATENT DOCUMENTS 3,376,600 A    4/1968  Shadley
6,277,021 B1 * 8/2001  Meyn ................. A22C 21/0007
                                                452/182
(Continued)

FOREIGN PATENT DOCUMENTS

EP    1164857 A2    1/2002
EP    2174551 A1    4/2010
(Continued)

OTHER PUBLICATIONS

Notice of Allowance issued in U.S. Appl. No. 16/463,132 dated Mar. 19, 2020.
(Continued)

*Primary Examiner* — Richard T Price, Jr.
(74) *Attorney, Agent, or Firm* — Rossi, Kimms & McDowell LLP

(57) ABSTRACT

A clamping device for a bone-in limb meat according to an embodiment includes: a pair of clamp pieces for holding the bone-in limb meat; a support portion openably/closably supporting the pair of clamp pieces in respective base portions of the clamp pieces; and rotation suppressing portions for suppressing a rotation of the bone-in limb meat, the rotation suppressing portions being respectively disposed so as to protrude from surfaces of the pair of clamp pieces along a direction perpendicular to a plane including opening/closing directions of the pair of clamp pieces. In an opened state of the pair of clamp pieces, the pair of clamp pieces respectively have tip portions at positions closer to a center line between the pair of clamp pieces than the rotation suppressing portions and positions farther away from the
(Continued)

support portion than the rotation suppressing portions in a direction along the center line.

15 Claims, 9 Drawing Sheets

(58) Field of Classification Search
USPC .................... 452/177, 179, 180, 182, 184
See application file for complete search history.

(56) References Cited

U.S. PATENT DOCUMENTS

| | | |
|---|---|---|
| 6,779,647 B1 | 8/2004 | Nagler |
| 7,059,954 B2 | 6/2006 | Annema |
| 7,404,759 B2 | 7/2008 | Sato |
| 7,588,487 B1 | 9/2009 | Born |
| 9,004,988 B2 * | 4/2015 | Van Der Steen ...... A22B 5/007 452/125 |
| 9,179,684 B2 | 11/2015 | Van Stuyvenberg |
| 9,451,779 B2 | 9/2016 | Hattori et al. |
| 2009/0238670 A1 | 9/2009 | Helgi |
| 2009/0298404 A1 | 12/2009 | Van Der Stouw |
| 2012/0231715 A1 | 9/2012 | Kodama et al. |
| 2012/0315834 A1 | 12/2012 | Van Der Steen |
| 2013/0004892 A1 * | 1/2013 | Tombs ............... G03G 15/6591 430/124.1 |
| 2013/0029574 A1 | 1/2013 | Van Der Steen |
| 2013/0315834 A1 * | 11/2013 | Praveen ................ B82Y 40/00 424/9.6 |
| 2015/0004892 A1 * | 1/2015 | Taniguchi .......... A22C 17/0093 452/136 |
| 2016/0037787 A1 * | 2/2016 | Van Der Steen ...... A22B 7/003 452/179 |
| 2019/0373904 A1 * | 12/2019 | Chimura ................ A22B 7/003 |

FOREIGN PATENT DOCUMENTS

| | | |
|---|---|---|
| EP | 2277382 A1 | 1/2011 |
| EP | 2356908 A2 | 8/2011 |
| GB | 2415944 A | 1/2006 |
| JP | 2001149001 A | 6/2001 |
| JP | 2005304314 A | 11/2005 |
| JP | 2013507101 A | 3/2013 |
| KR | 1020080074978 A | 8/2008 |
| WO | 0059311 A2 | 10/2000 |
| WO | 2007138616 A2 | 12/2007 |
| WO | 2008136513 A1 | 11/2008 |
| WO | 2009139031 A1 | 11/2009 |
| WO | 2014064773 A1 | 5/2014 |

OTHER PUBLICATIONS

Notice of Allowance issued in U.S. Appl. No. 16/463,098 dated Mar. 24, 2020.
Notice of Allowance issued in U.S. Appl. No. 16/463,108 dated Jan. 9, 2020.
International Search Report issued in Intl. Appln. No. PCT/JP2018/037378 dated Nov. 13, 2018 English translation provided.
Written Opinion issued in Intl. Appln. No. PCT/JP2018/037378 dated Nov. 13, 2018.
International Search Report issued in Intl. Appln. No. PCT/JP2018/037388 dated Nov. 13, 2018. English translation provided.
Written Opinion issued in Intl. Appln. No. PCT/JP2018/037388 dated Nov. 13, 2018.
International Search Report issued in Intl. Appln. No. PCT/JP2018/037391 dated Nov. 13, 2018. English translation provided.
Written Opinion issued in Intl. Appln. No. PCT/JP2018/037391 dated Nov. 13, 2018.
Copending U.S. Appl. No. 16/463,098, filed May 22, 2019.
Copending U.S. Appl. No. 16/463,108, filed May 22, 2019.
Copending U.S. Appl. No. 16/463,132, filed May 22, 2019.
Office Action issued in European Appln. No. 18889969.4 dated Nov. 2, 2020.
Office Action issued in Korean Appln. No. 10-2019-7018357 dated Feb. 1, 2021. English translation provided.
Extended European Search Report issued in European Appln. No. 18864870.3 dated Jan. 24, 2020.
Office Action issued in European Application No. 18889969.4 dated Jun. 12, 2020.

\* cited by examiner $\alpha_3 < \alpha_2$

US 11,033,036 B2

CLAMPING DEVICE FOR BONE-IN LIMB MEAT, LOADING DEVICE FOR BONE-IN LIMB MEAT, AND CLAMPING METHOD FOR BONE-IN LIMB MEAT

TECHNICAL FIELD

The present disclosure relates to a clamping device for a bone-in limb meat, a loading device including the clamping device, and a clamping method for the bone-in limb meat.

BACKGROUND

In order to save labor, a process of slaughtering an edible chicken carcass undergoes transition from manual processing to automatic processing by a machine.

Patent Document 1 discloses an automatic deboner which performs a process of deboning a bone-in thigh meat. This deboner intermittently conveys the bone-in thigh meat between a plurality of processing stations while suspending it with a clamping device, and sequentially performs steps of cutting a meat of the bone-in thigh meat, separating bone and meat, and the like in the respective stations, to enables automatic deboning.

Patent Document 2 discloses holding a bone-in thigh meat conveyed by a conveyor by a clamping device mounted to a tip of a multi-axes articulated arm and suspending it to a hanger.

CITATION LIST

Patent Literature

Patent Document 1: JP2013-507101 (translation of a PCT application)
Patent Document 2: WO2009/139031A

SUMMARY

Technical Problem

When loading bone-in limb meats such as bone-in thigh meats to a processing device such as an automatic deboner, it is necessary to load a plurality of bone-in limb meats in the same direction so that a processing step for the plurality of bone-in limb meats can be performed uniformly. At present, however, it is difficult to automate, by a machine, a work to load the plurality of bone-in limb meats in the same direction, so it is necessary for person to support to do this work. Neither Patent Document 1 nor Patent Document 2 discloses a means for automating a work to load a plurality of bone-in limb meats to an automatic deboner or the like in the same direction.

In addition, in order to load a bone-in limb meat to a processing device or in order to suspend the bone-in limb meat to a hanger to transport it to the processing device, a bone-in thigh meat is held by a clamping device mounted to the tip of a multi-axes articulated arm. In this case, it is required to securely hold the bone-in limb meat by the clamping device or reduce a time for a holding operation.

An object of one embodiment is to propose a clamping device capable of securely holding a bone-in limb meat when holding the bone-in limb meat by the clamping device.

Furthermore, an object of one embodiment is to automate, by a machine without manpower, a work to suspend or load bone-in limb meats in the same direction when suspending the bone-in limb meats to hangers or when loading the bone-in limb meats to the processing device.

Solution to Problem (1) A clamping device for a bone-in limb meat according to one embodiment includes: a pair of clamp pieces for holding the bone-in limb meat; a support portion openably/closably supporting the pair of clamp pieces at respective base portions of the clamp pieces; and rotation suppressing portions for suppressing a rotation of the bone-in limb meat, the rotation suppressing portions being respectively disposed so as to protrude from surfaces of the pair of clamp pieces along a direction perpendicular to a plane including opening/closing directions of the pair of clamp pieces.

In an opened state of the pair of clamp pieces, the pair of clamp pieces respectively have tip portions at positions closer to a center line between the pair of clamp pieces than the rotation suppressing portions and positions farther away from the support portion than the rotation suppressing portion in a direction along the center line.

A "bone-in limb meat" in the present description includes a limb section of an edible chicken carcass such as a thigh section or an arm section and includes a section in a state in which a bone part and a meat part are not slaughtered or separated.

With the above configuration (1), when holding the bone-in limb meat by the pair of clamp pieces, it is possible to suppress a rotation and wobble in the bone-in limb meat by the above rotation suppressing portions, thereby fixing the bone-in limb meat to a clamping position. In addition, the tip portions of the clamp pieces are respectively inside (the side of the center line) of the rotation suppressing portions and closer to the tip side (a side farther away from the above support portion) than the rotation suppressing portions. Therefore, at the start of a holding operation, the tip portions of the clamp pieces first touch the bone-in limb meat, are inserted under the bone-in limb meat, and then pick up the bone-in limb meat. With this operation, it is possible to securely hold the bone-in limb meat by the pair of clamp pieces. This allows stable holding, making it possible to accelerate the operation of the clamp pieces.

Furthermore, it is possible to suspend the bone-in limb meat to a hanger in a desired direction or load the bone-in limb meat to a processing portion such as a deboner via the hanger by mounting the above support portion to an arm capable of position control and orientation control, and controlling the clamping device holding the bone-in limb meat to a desired position and orientation.

(2) In an embodiment, in the above configuration (1), the rotation suppressing portions are respectively disposed to the pair of clamp pieces and respectively include contact pieces extending toward a side of the center line, and the contact pieces are configured to contact the bone-in limb meat in a closed state of the pair of clamp pieces.

With the above configuration (2), when holding the bone-in limb meat by the pair of clamp pieces, it is possible to fix the bone-in limb meat by the above contact pieces, and thus to prevent the rotation and wobble in the held bone-in limb meat.

(3) In an embodiment, in the above configuration (2), wherein each of the contact pieces is configured to have a plate-shape body extending along a direction intersecting with the plane.

With the above configuration (3), the contact pieces each extend along the longitudinal direction of the bone-in limb meat held by the contact piece, making it possible to fix the bone-in limb meat more firmly.

(4) In an embodiment, in any one of the above configurations (1) to (3), the rotation suppressing portions include wall portions disposed to the pair of clamp pieces respectively so as to face each other across a space between the pair of clamp pieces, and in the opened state, the tip portions of the clamp pieces are respectively positioned closer to the center line than the wall portions and respectively positioned farther away from the support portion than the wall portions in the direction along the center line.

With the above configuration (4), it is possible to increase the strength of the clamp pieces by the presence of the wall portions, and to allow the rotation suppressing portions to support the bone-in limb meat picked up by the tip portions of the clamp pieces in an early stage of the holding operation because the wall portions are in the above positional relationship with respect to the tip portions of the clamp pieces. Thus it is possible to securely hold the bone-in limb meat.

(5) In an embodiment, in the above configuration (4), each of the wall portions at least partially extends along an outline on a far side of a corresponding one of the clamp pieces from the center line.

With the above configuration (5), because the above wall portions are positioned on the far side from the center line between the clamp pieces, the wall portions do not get in the way of the operation of the clamp pieces but can assist the operation of the clamp pieces, thereby preventing the bone-in limb meat from dropping off the clamp pieces.

(6) In an embodiment, in the above configuration (4) or (5), each of the wall portions includes: a first wall portion extending along the center line in a closed state of the pair of clamp pieces; a second wall portion connected to an end portion of the first wall portion on a side of the support portion, and bending and extending from the first wall portion toward the center line; and a third wall portion connected to an opposite end portion of the first wall portion against the support portion, and bending and extending from the first wall portion toward the center line.

With the above configuration (6), the first wall portion, the second wall portion, and the third wall portion by which the above wall portions are each constituted are disposed so as to surround the bone-in limb meat held by the clamp pieces, and thus the first wall portion, the second wall portion, and the third wall portion enclose the bone-in limb meat picked up by the tip portions of the clamp pieces in the early stage of the holding operation, making it possible to prevent the bone-in limb meat from dropping off the tip portions, and suppress the rotation and wobble in the held bone-in limb meat.

(7) In an embodiment, in the above configuration (6), the second wall portion and the third wall portion are inclined with respect to the center line in the closed state of the pair of clamp pieces, and an inclination angle of the third wall portion with respect to the center line is smaller than an inclination angle of the second wall portion with respect to the center line.

With the above configuration (7), since the inclination angle of third wall portion on the tip side with respect to the center line is smaller than the inclination angle of second wall portion on the back side with respect to the center line, when the clamp pieces hold the bone-in limb meat, the third wall portion enables to approach a surface on which the bone-in limb meat is placed (to be also referred to as a "work placement surface" hereinafter) even if the pair of clamp pieces are inclined from a direction perpendicular to the work placement surface. Thus it is possible to insert the third wall portion below the bone-in limb meat picked up by the tip portions of the clamp pieces and prevent the bone-in limb meat from dropping off the tip portions.

(8) In an embodiment, in any one of the above configurations (1) to (7), the tip portions of the respective clamp pieces are configured to overlap each other when viewed from a direction perpendicular to the plane in a closed state of the pair of clamp pieces.

With the above configuration (8), it is possible to close the tip portions of the clamp pieces each other before the pair of clamp pieces are set in the closed state, and thus to prevent the bone-in limb meat from falling from the tip sides of the clamp pieces.

According to an embodiment, a loading device for loading a bone-in limb meat to a processing portion includes: the clamping device for the bone-in limb meat having any one of the above configurations (1) to (8); and an arm supporting the support portion and capable of controlling an operation of the clamping device.

The bone-in limb meat held by the clamping device for the bone-in limb meat is loaded to the processing portion.

Herein, "loading to the processing portion" includes selectively suspending the bone-in limb meat to a hanger in the preceding stage and loading the bone-in limb meat from the hanger to the processing portion.

With the above configuration (9), it is possible to securely hold the bone-in limb meat by having the clamping device of the above configuration, and also to accelerate the operation of the clamp pieces because stable holding becomes possible. Furthermore, it is possible to suspend the bone-in limb meat to a hanger in a desired direction or load the bone-in limb meat to the processing portion via the hanger by mounting the above support portion is mounted to an arm capable of position control and orientation control, and controlling the clamping device holding the bone-in limb meat to a desired position and orientation.

(10) In an embodiment, in the above configuration (9), the loading device further includes: a conveyor conveying the bone-in limb meat to the clamping device for the bone-in limb meat; a determination portion capable of acquiring orientation information of the bone-in limb meat conveyed by the conveyor; and a control portion operating the arm based on the orientation information acquired by the determination portion and loading the bone-in limb meat to the processing portion in a predetermined direction.

With the above configuration (10), the above control portion operates the arm based on the orientation information acquired by the determination portion, making it possible to sequentially hold, by the clamping device, the bone-in limb meats sent with random orientations by the conveyor and suspend the held bone-in limb meats to the hangers in the predetermined same direction, or load them to the processing portion.

(11) In an embodiment, in the above configuration (10), the orientation information includes front/back surface information indicating whether an upper surface of the bone-in limb meat placed on the conveyor is a front surface or a back surface, and the control portion is configured to control an operation of the arm based on the orientation information and the front/back surface information, and load the bone-in limb meat to the processing portion such that one of the front surface or back surface always faces the same direction with respect to the processing portion.

With the above configuration (11), in a case in which the bone-in limb meat has a front surface or a back surface like a poultry bone-in thigh meat, the control portion controls the operation of the arm based on the orientation information and the front/back surface information, making it possible to suspend the bone-in limb meat to the hanger such that one of the front surface or back surface thereof always faces the same direction, or loading it to the processing portion such as a deboner.

(12) In an embodiment, in the above configuration (10) or (11), the loading device further includes a loader portion receiving the bone-in limb meat from the clamping device for the bone-in limb meat and passing the bone-in limb meat to the processing portion.

The loader portion includes a rotatable shaft and three or more hangers being rotatable about the rotatable shaft and disposed with an equal angular difference with respect to the rotatable shaft.

With the above configuration (12), when suspending the bone-in limb meat from the clamping device to the hanger of the loader portion, it is possible to simplify the operations of the arm and clamping device by selecting, based on the orientation information of the bone-in limb meat acquired by the determination portion, the hanger to suspend. Thus it is possible to increase a suspension speed to the hanger or increase a speed at which the bone-in limb meat is loaded to the processing portion.

(13) In an embodiment, in the above configuration (12), the control portion is configured to control the loader portion to suspend the bone-in limb meat from the clamping device to the hanger on a first side with respect to a reference line when the determination portion determines the upper surface of the bone-in limb meat is the front surface, the reference line connecting the rotatable shaft and a support portion rotatably supporting the arm, and suspend the bone-in limb meat from the clamping device to the hanger on a second side with respect to the center line when the determination portion determines the upper surface of the bone-in limb meat is the back surface.

With the above configuration (13), the bone-in limb meat is suspended to the hanger at different positions across the above reference line depending on whether the upper surface of the bone-in limb meat before being held is the front surface or the back surface, making it possible to simplify the operations of the arm and the clamping device. Thus it is possible to increase the suspension speed to the hanger or the loading speed to the processing portion.

(14) According to an embodiment, a clamping method for holding a bone-in limb meat by using a clamping device, the clamping device including: a pair of clamp pieces for holding the bone-in limb meat; a support portion openably/closably supporting the pair of clamp pieces at respective base portions of the clamp pieces; and rotation suppressing portions for suppressing a rotation of the bone-in limb meat, the rotation suppressing portions being respectively disposed so as to protrude from surfaces of the pair of clamp pieces along a direction perpendicular to a plane including opening/closing directions of the pair of clamp pieces, wherein in an opened state of the pair of clamp pieces, the pair of clamp pieces respectively have tip portions at positions closer to a center line between the pair of clamp pieces than the rotation suppressing portions and positions farther away from the support portion than the rotation suppressing portion in a direction along the center line, the method includes: a preceding step of closing the pair of clamp pieces and inserting the tip portions of the pair of clamp pieces below a clamping section of the bone-in limb meat, thereby picking up the clamping section; and a holding step of holding and transporting the clamping section by the pair of clamp pieces.

With the above method (14), the above preceding step is operated before the above holding step, making it possible to securely hold the clamp section by the pair of clamp pieces. In addition, stable holding is allowed, making it possible to accelerate the holding operation by the pair of clamp pieces and to increase the suspension speed to the hanger or the loading speed to the processing portion.

(15) In an embodiment, in the above method (14), the rotation suppressing portion is disposed to each of the pair of clamp pieces and includes a contact piece extending toward the side of the center line, and in the holding step, at least one of the contact pieces is inserted into a depression of the bone-in limb meat.

With the above method (15), the contact piece is inserted into the depression simultaneously when the bone-in limb meat is held by the pair of clamp pieces, making it possible to suppress the rotation and wobble in the held bone-in limb meat.

Advantageous Effects

According to an embodiment, it is possible to securely hold the bone-in limb meats by the clamping device, and to automate, by the machine without manpower, a work to load or suspend the bone-in limb meats in the same direction when suspending the bone-in limb meats to a plurality of hangers or when loading a plurality of bone-in limb meats to a processing device such as a deboner. It is also possible to align the bone-in limb meats in the same direction, and thus to suppress the moving amount of an arm. Thus it is possible to use a plurality of arms, and to correspond to a processing speed of an automatic deboning machine operating at a high speed. It also becomes possible to simplify the structure of the clamping device, and thus to improve maintainability and system halt due to a failure.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
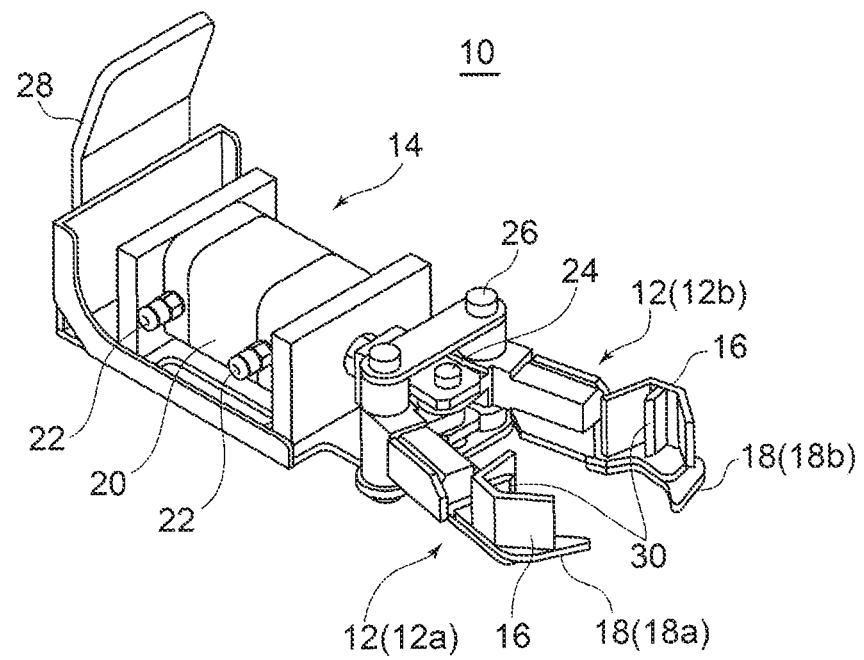
FIG. 1 is a perspective view of a clamping device (opened state) for a bone-in limb meat according to an embodiment.
Figure 2:
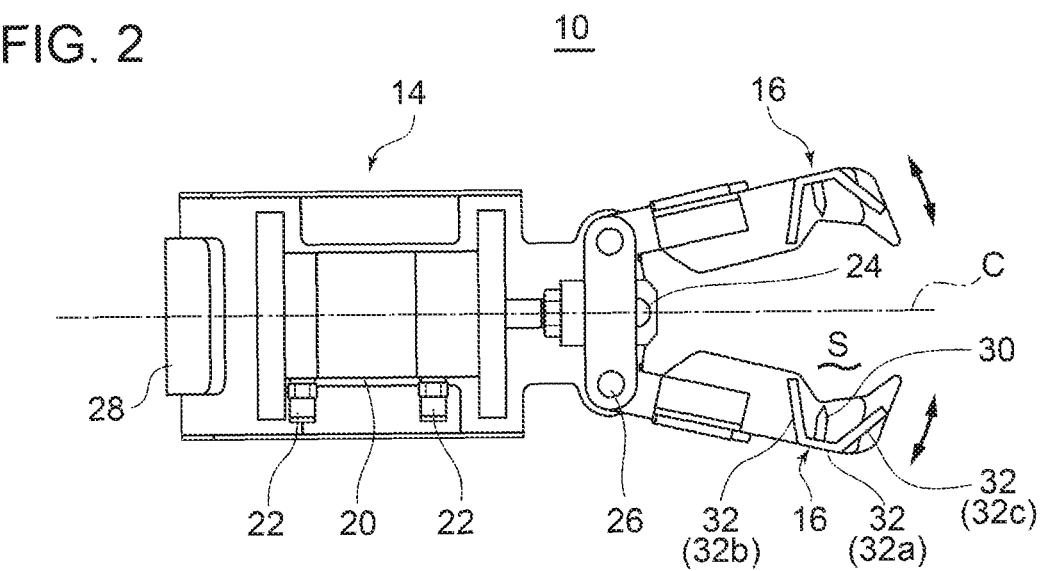
FIG. 2 is a planar view of the clamping device (opened state) for the bone-in limb meat according to an embodiment.
Figure 3:
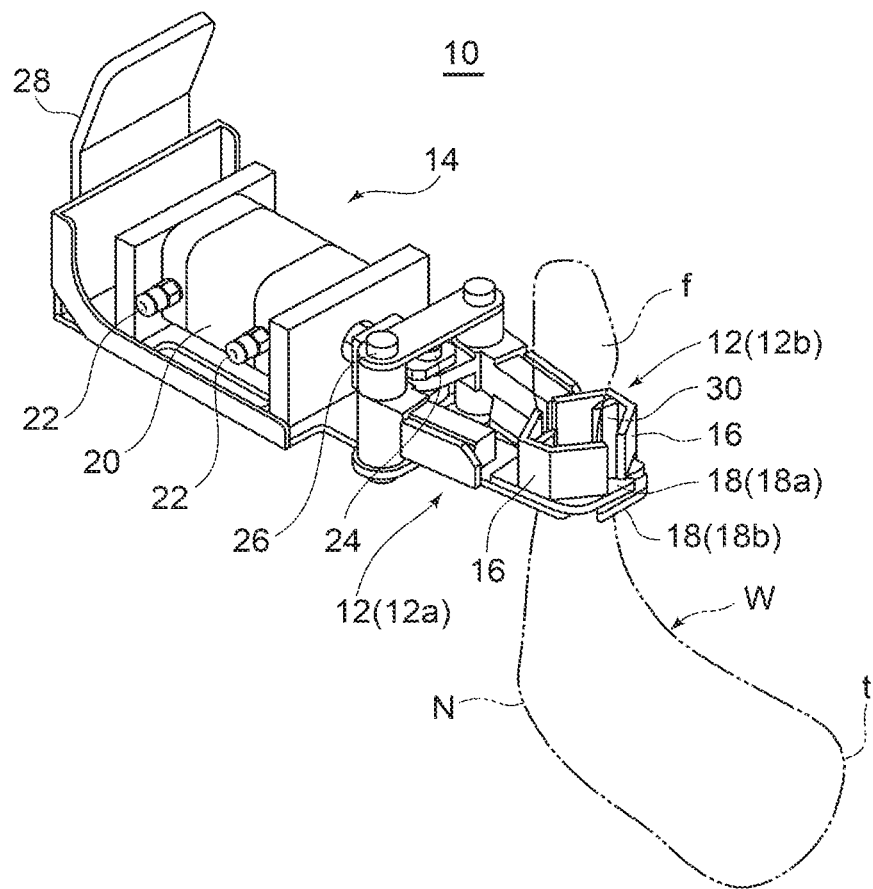
FIG. 3 is a perspective view of the clamping device (closed state) for the bone-in limb meat according to an embodiment.
Figure 4:
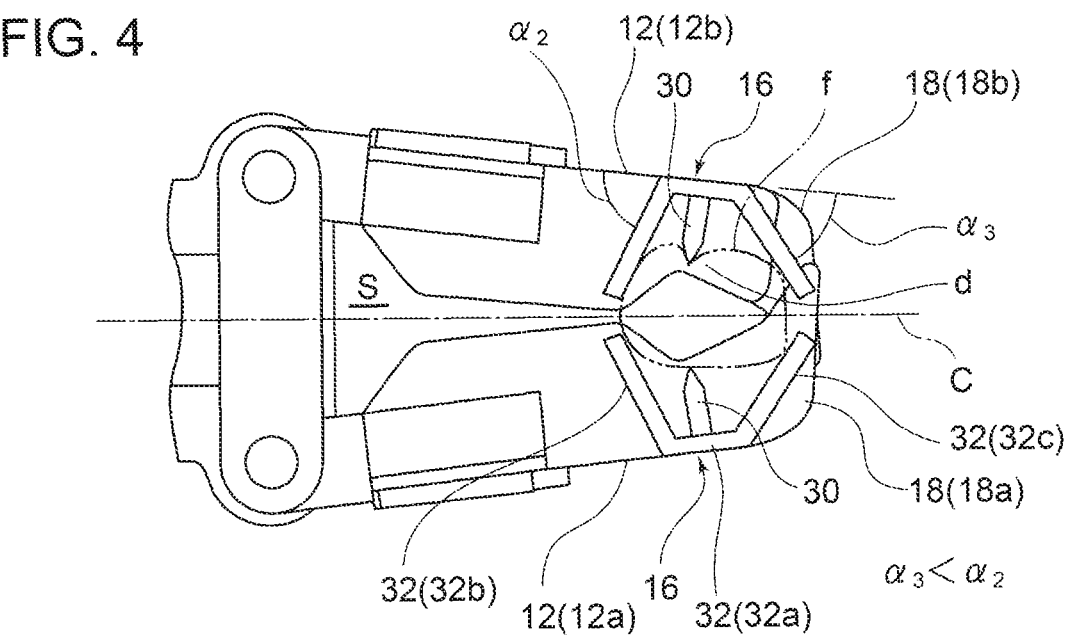
FIG. 4 is a planar view of the clamping device (closed state) for the bone-in limb meat according to an embodiment.

Each of FIGS. 1 to 4 shows a clamping device 10 for a bone-in limb meat according to an embodiment. Each of FIGS. 1 and 2 shows an opened state of a pair of clamp pieces 12 (12a and 12b). Each of FIGS. 3 and 4 shows a closed state capable of holding a bone-in limb meat W. The bone-in limb meat W shown in FIG. 3 represents an outline of a poultry bone-in thigh meat. In this example, a small diameter portion between a thigh section t and an enlarged diameter portion of a limb neck part f serves as a section held by the pair of clamp pieces 12. The bone-in limb meat W has a knee part N as a joint part between a thighbone and a lower leg bone.

The clamping device 10 includes the pair of clamp pieces 12, a support portion 14, and rotation suppressing portions 16. The support portion 14 openably/closably supports the pair of clamp pieces 12 in base portions of the pair of clamp pieces 12. The rotation suppressing portions 16 are capable of suppressing a rotation and wobble in the bone-in limb meat W when the bone-in limb meat W is held by the pair of clamp pieces 12. The rotation suppressing portions 16 are disposed so as to protrude from the surfaces of the respective clamp pieces 12 (12a and 12b) along a direction perpendicular to a plane including opening/closing directions (arrow directions in FIG. 2) of the pair of clamp pieces 12 (to be also referred to as a "opening/closing-direction plane" hereinafter). In the opened state, tip portions 18 (18a and 18b) of the clamp pieces are respectively at positions closer to a center line C between the pair of clamp pieces than the rotation suppressing portions 16, and positions farther away from the support portion 14 than the rotation suppressing portions 16 in a direction along the center line C, that is, positions on a tip side.

With the above configuration, when holding the bone-in limb meat W by the pair of clamp pieces 12, it is possible to suppress the rotation and wobble in the bone-in limb meat W by the rotation suppressing portions 16, thereby fixing the bone-in limb meat W to a clamping position. In addition, because the tip portions 18 of the clamp pieces 12 are closer to the side of the center line C and the tip side than the rotation suppressing portions 16, at the start of a holding operation, the tip portions 18 of the clamp pieces 12 first touch the bone-in limb meat W, are inserted under a clamped section (limb neck part) of the bone-in limb meat W, and then pick up the clamped section. With this operation, it is possible to securely hold the bone-in limb meat by the pair of clamp pieces 12. It also allows stable holding, making it possible to accelerate the operation of the clamp pieces 12.

Furthermore, it is possible to suspend the bone-in limb meat W to a hanger in a desired direction or load the bone-in limb meat W to a processing portion such as a deboner via the hanger by mounting the support portion 14 to an arm capable of position control and orientation control, and controlling the clamping device 10 holding the bone-in limb meat W to a desired position and orientation.

In an embodiment, the support portion 14 includes an actuator 20 for opening/closing the pair of clamp pieces 12. For example, the actuator 20 is constituted of a hydraulic cylinder including inlet/outlet ports 22 for working oil and reciprocates a shaft 24 in a direction along the center line C. The pair of clamp pieces 12 are rotatably supported by shafts 26, the shafts 26 rotates by reciprocating motion of the shaft 24, and then the pair of clamp pieces 12 are opened and closed.

Moreover, a mounting plate 28 is disposed on the back surface of the support portion 14, and the support portion 14 is mounted to a multi-axes articulated arm capable of controlling the position and orientation of the support portion 14 via the mounting plate 28.

In an embodiment, the rotation suppressing portions 16 are respectively disposed to the pair of clamp pieces 12 (12a and 12b), and the rotation suppressing portions 16 include contact pieces 30 extending toward the side of the center line C. As shown in FIGS. 3 and 4, the contact pieces 30 are configured to contact the held bone-in limb meat W when the pair of clamp pieces 12 are in the closed state.

According to this embodiment, when holding the bone-in limb meat W by the pair of clamp pieces 12, it is possible to fix the bone-in limb meat W by the contact pieces 30, and thus to prevent the rotation and wobble in the bone-in limb meat W.

In an embodiment, each contact piece 30 is formed by a plate-shape body extending along a direction intersecting with the opening/closing-direction plane. The contact pieces 30 extend along the longitudinal direction of the held limb neck part, making it possible to fix the limb neck part to the clamp pieces more firmly.

FIG. 4 shows a state in which a poultry bone-in thigh meat of a chicken or the like serving as the bone-in limb meat W is held by the pair of clamp pieces 12. If the bone-in limb meat W is the poultry bone-in thigh meat, a depression d exists in the limb neck part f in the longitudinal direction. When the contact pieces 30 are the plate-shape bodies extending along the direction intersecting with the opening/closing-direction plane (perpendicular direction in FIG. 4), one of the contact pieces 30 is inserted into the depression d, making it possible to further improve a holding force for the bone-in thigh meat.

In an embodiment, the rotation suppressing portions 16 are formed including wall portions 32. The wall portions 32 are respectively disposed to the pair of clamp pieces 12 (12a and 12b) so as to face each other across a space S between the pair of clamp pieces 12. In addition, in the opened state, the tip portions 18 (18a and 18b) of the clamp pieces 12 (12a and 12b) are respectively positioned closer to the center line C than the wall portions 32 and positioned farther away from the support portion 14 than the wall portions 32 in the direction along the center line C.

According to this embodiment, it is possible to increase the strength of the clamp pieces 12 by the presence of the wall portions 32, and to allow the rotation suppressing portions 16 to support the bone-in limb meat W picked up by the tip portions 18 of the clamp pieces 12 in an early stage of the holding operation because the wall portions 32 are in the above positional relationship with respect to the tip portions 18 of the clamp pieces 12. Thus it is possible to securely hold the bone-in limb meat W.

In an embodiment, since the wall portions 32 at least partially extend along outlines on far sides of the clamp pieces 12 (12a and 12b) from the center line C respectively, the wall portions do not get in the way of the holding operation of the clamp pieces 12 but can assist the operation of the clamp pieces 12, thereby preventing the bone-in limb meat W from dropping off the clamp pieces 12.

In an embodiment, the wall portions 32 forming the rotation suppressing portions 16 are constituted of first wall portions 32 (32a), second wall portions 32 (32b), and third wall portions 32 (32c). The first wall portions 32 (32a) extend along the center line C in the closed state of the pair of clamp pieces 12. The second wall portions 32 (32b) are connected to the end portions of the first wall portions 32 (32a) on the side of the support portion 14, and bend and extend from the first wall portions 32 (32a) toward the center line C. The third wall portions 32 (32c) are connected to the end portions of the first wall portions 32 (32a) on an opposite side to the support portion 14, and bend and extend from the first wall portions 32 (32a) toward the center line C. The contact pieces 30 are disposed between the second wall portions 32 (32b) and the third wall portions 32 (32c).

According to this embodiment, the first wall portions 32 (32a), the second wall portions 32 (32b), and the third wall portions 32 (32c) are disposed so as to surround the bone-in limb meat W held by the clamp pieces 12, and thus the first wall portions 32 (32a), the second wall portions 32 (32b), and the third wall portions 32 (32c) enclose the bone-in limb meat W picked up by the tip portions 18 of the clamp pieces 12 in the early stage of the holding operation, making it possible to prevent the bone-in limb meat W from dropping off the tip portions 18, and suppress the rotation and wobble in the held bone-in limb meat W.

In an embodiment, as shown in FIG. 4, the second wall portions 32 (32b) and the third wall portions 32 (32c) are inclined with respect to the center line C in the closed state of the pair of clamp pieces 12, and an inclination angle $\alpha_3$ of the third wall portion 32 (32c) with respect to the center line C is smaller than an inclination angle $\alpha_2$ of the second wall portion 32 (32b) with respect to the center line C.

According to this embodiment, when the pair of clamp pieces 12 hold the bone-in limb meat W, the third wall portions 32 (32c) can approach a work placement surface where the bone-in limb meat W is placed even if the clamp pieces 12 are inclined with respect to the work placement surface. In this way, it is possible to insert the third wall portions 32 (32c) below the bone-in limb meat W picked up by the tip portions 18 of the clamp pieces 12 and prevent the bone-in limb meat W from dropping off the tip portions 18. Thus it is possible to securely hold the bone-in limb meat W.

Figure 5:
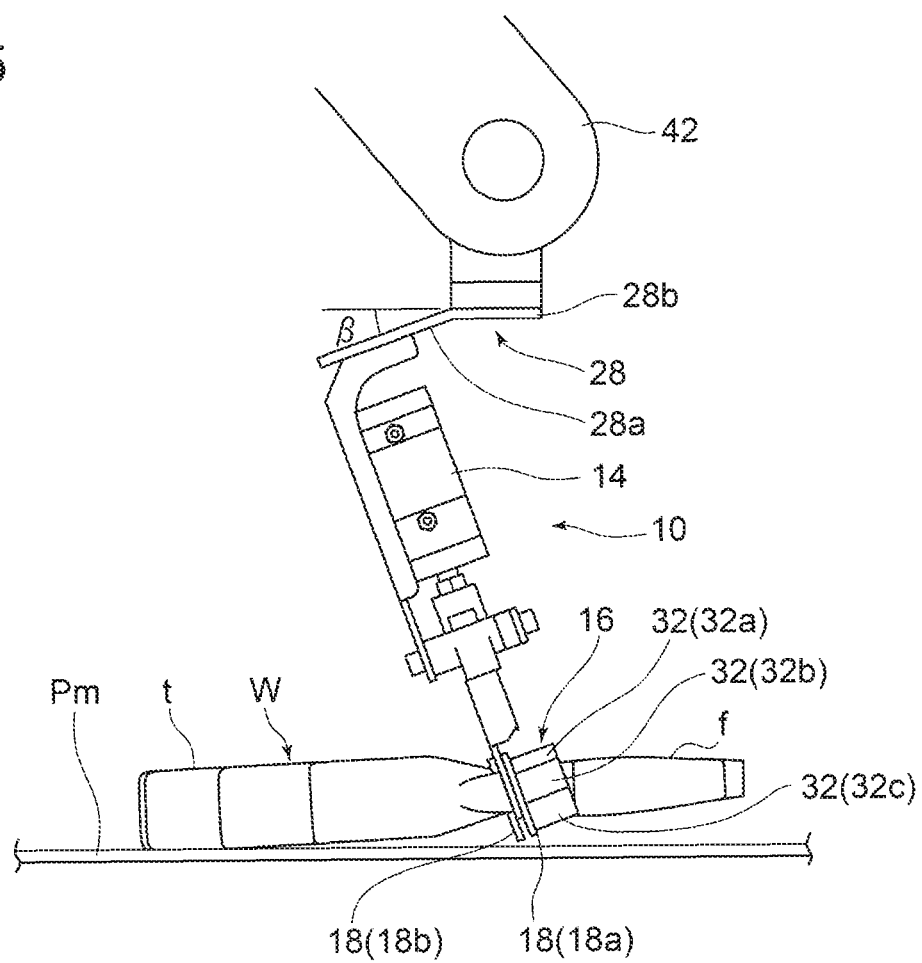
FIG. 5 is an explanatory view showing a holding operation of the clamping device for the bone-in limb meat according to an embodiment.

FIG. 5 shows a scene in which the clamping device 10 holds and transports the bone-in limb meat W placed on a work placement surface Pm. The clamping device 10 is mounted to the arm 42 via the mounting plate 28. The arm 42 is formed as a multi-axes articulated arm, and capable of controlling the position and orientation of the clamping device 10. A clamping-device-side mounting portion 28a of the mounting plate 28 is inclined by an angle β with respect to an arm-side mounting portion 28b. As a result, the clamp pieces 12 are inclined by the angle β with respect to the work placement surface Pm. This inclination facilitates an approach operation of the clamping device 10 to the bone-in limb meat W. In addition, the inclination angle $\alpha_3$ of the third wall portion 32 (32c) with respect to the center line C is smaller than the inclination angle $\alpha_2$ of the second wall portion 32 (32b) with respect to the center line C ($\alpha_3 < \alpha_2$) even if the clamp piece 12 is inclined with respect to the work placement surface Pm, allowing the third wall portion 32 (32c) to make an inclination angle with respect to the work placement surface Pm smaller at the time of the holding operation. It is therefore possible, by the two third wall portions 32 (32c) respectively disposed to the pair of clamp pieces 12, to quickly enclose the bone-in limb meat W picked up by the tip portions 18 of the clamp pieces 12.

In an embodiment, as shown in FIGS. 3 and 4, the tip portions 18 (18a and 18b) of the clamp pieces 12 are configured to overlap each other when viewed from the direction perpendicular to the opening/closing-direction plane in the closed state.

According to this embodiment, it is possible to close the tip portions of the clamp pieces 12 each other before the pair of clamp pieces 12 are set in the closed state, and thus to prevent the bone-in limb meat W from falling from the tip sides of the clamp pieces.

In the embodiment shown in FIG. 3, the pair of tip portions 18 (18a and 18b) are disposed to be offset in the direction perpendicular to the opening/closing-direction plane. Thus the tip portions 18 (18a and 18b) can overlap each other.

Figure 6:
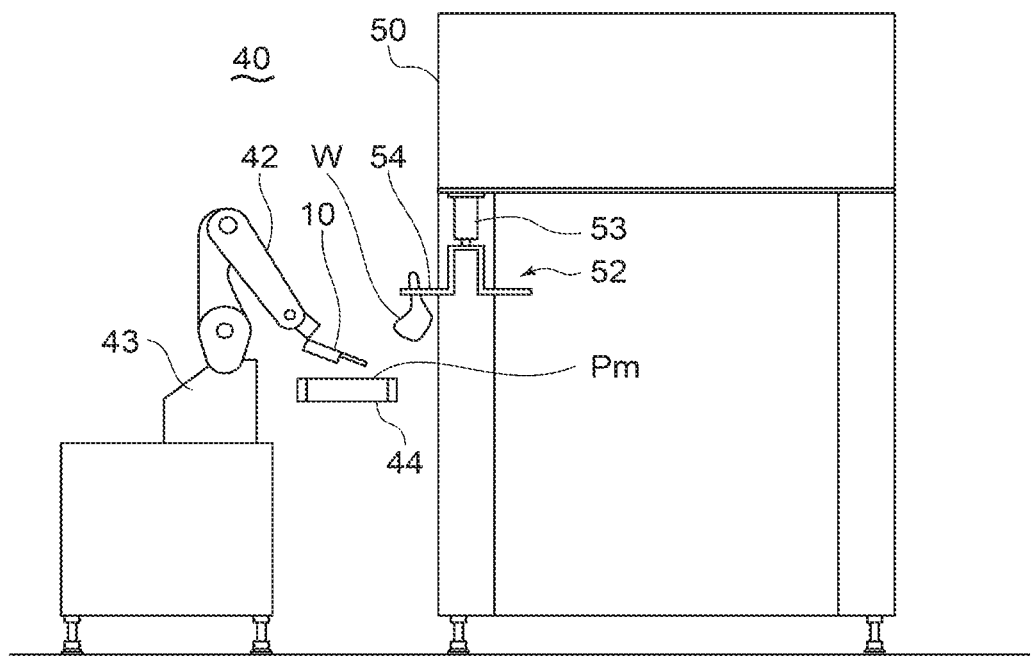
FIG. 6 is a front view showing a loading device for the bone-in limb meat according to an embodiment.
Figure 7:
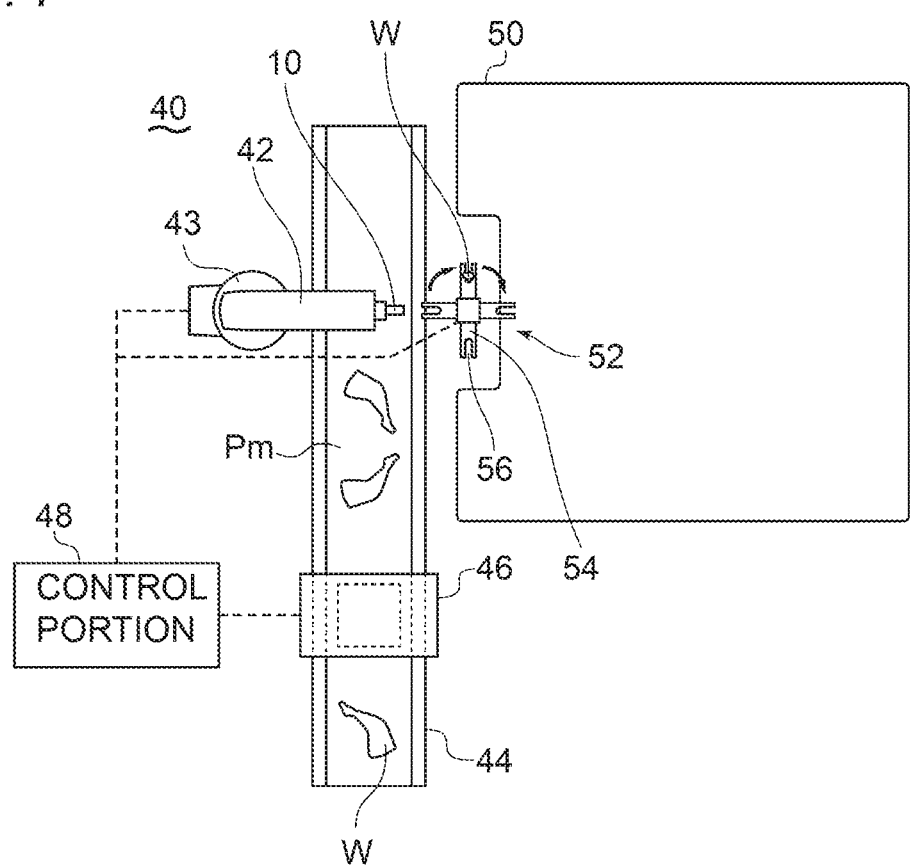
FIG. 7 is a planar view showing the loading device for the bone-in limb meat according to an embodiment.

Each of FIGS. 6 and 7 shows a loading device 40 for the bone-in limb meat according to an embodiment. The loading device 40 is a loading device for loading the bone-in limb meat W to a processing portion 50 such as a deboner. In the loading device 40, the clamping device 10 of the above configuration is mounted to the arm 42 via the support portion 14. The arm 42 is configured to be able to control the operation of the clamping device 10. The bone-in limb meat W on the work placement surface Pm is held by the clamping device 10 and finally loaded to the processing portion 50.

With the above configuration, it is possible to securely hold the bone-in limb meat W by having the clamping device 10 of the above configuration, and also to accelerate the operation of the clamp pieces 12 because stable holding becomes possible. Furthermore, it is possible to suspend the bone-in limb meat W to a hanger 54 of a loader portion 52 in a desired direction or further load the bone-in limb meat W to the processing portion 50 via the hanger 54 by controlling the clamping device 10 holding the bone-in limb meat W to the desired position and orientation with the arm 42.

In an embodiment, the arm 42 is formed as the multi-axes articulated arm, and capable of operating the support portion 14 of the clamping device 10 at an arbitrary position and orientation. Further, the processing portion 50 is a deboner which separates the bone-in limb meat W into a bone part and a meat part. Furthermore, a recess portion 56 is formed in each hanger 54, and the bone-in limb meat W is suspended with its small diameter portion below the limb neck part being inserted into the recess portion 56.

In an embodiment, a conveyor 44 is provided, which conveys the bone-in limb meats W to the clamping device 10 on a preceding side of a processing step. In the conveyor 44 on an upstream side of the clamping device 10 in a conveyance direction, a determination portion 46 is disposed, which can acquire orientation information of the bone-in limb meats W conveyed by the conveyor 44. A control portion 48 operates the arm 42 based on the orientation information of the individual bone-in limb meats W acquired by the determination portion 46, suspends the individual bone-in limb meats W to the hangers 54 in a predetermined direction, or further loads them to the processing portion 50 via the hangers 54. In this embodiment, the work placement surface Pm is a conveyance surface of the conveyor 44. For example, if the knee parts N of the individual bone-in limb meats W are suspended to the hangers 54 toward the side of the arm 42, the hangers 54 enable to inverte, and load all the bone-in limb meats W to the processing portion 50 in a state in which their knee parts N are turned toward an opposite side.

With the above configuration, the control portion 48 operates the arm 42 based on the orientation information acquired by the determination portion 46, making it possible to sequentially hold, by the clamping device 10, the bone-in limb meats W sent with random orientations on the conveyance surface (work placement surface Pm) of the conveyor 44 and suspend the held bone-in limb meats W to the hangers 54 in the predetermined same direction, or further load them to the processing portion 50 via the hangers 54.

In an embodiment, the determination portion 46 includes an image capturing portion and an image processing portion. The image capturing portion captures images of the bone-in limb meats W conveyed on the conveyor 44, and the image processing portion acquires the orientation information of the bone-in limb meats W from the images of the bone-in limb meats W captured by the image capturing portion.

In an embodiment, the above orientation information includes front/back surface information indicating whether the upper surface of each bone-in limb meat W placed on the conveyor 44 is a front surface or a back surface. The control portion 48 is configured to control the operation of the arm 42 based on the orientation information and the front/back surface information, suspend the bone-in limb meat W to the hanger 54 such that one of the front surface or back surface thereof always faces the same direction, or further load it to the processing portion 50 via the hanger 54.

According to this embodiment, in a case in which the bone-in limb meat W has the front surface or the back surface like a poultry bone-in thigh meat, the control portion 48 controls the operation of the arm 42 based on the orientation information and the front/back surface information, making it possible to suspend the bone-in limb meat W to the hanger 54 such that one of the front surface or back surface thereof always faces the same direction, or load it to the processing portion 50 such as the deboner.

In an embodiment, one type of a right limb or left limb of the bone-in limb meat W is placed on the conveyor 44 and conveyed to the clamping device 10. If the bone-in limb meat W held by the clamping device 10 has one type of the right limb or the left limb, it is possible to suspend the bone-in limb meat W to the hanger 54 or load it to the processing portion 50 while aligning the directions of the back/front surfaces and the direction of the knee part N simultaneously. Thus it is possible to uniformly perform a process in the processing portion 50.

In an embodiment, as shown in FIGS. 6 and 7, the loader portion 52 is provided for receiving the bone-in limb meat W from the clamping device 10 and passing it to the processing portion 50. The loader portion 52 includes a rotatable shaft 53 and three or more hangers 54 being rotatable about the rotatable shaft 53 and disposed with an equal angular difference with respect to the rotatable shaft 53.

According to this embodiment, when suspending the bone-in limb meat W from the clamping device 10 to the hanger 54 of the loader portion 52, it is possible to simplify the operations of the arm 42 and clamping device 10 by selecting, based on the orientation information of the bone-in limb meat W acquired by the determination portion 46, the hanger 54 to suspend. Thus it is possible to increase a suspension speed to the hanger 54 or increase a loading speed at which the bone-in limb meat W is loaded to the processing portion 50.

Figure 8:
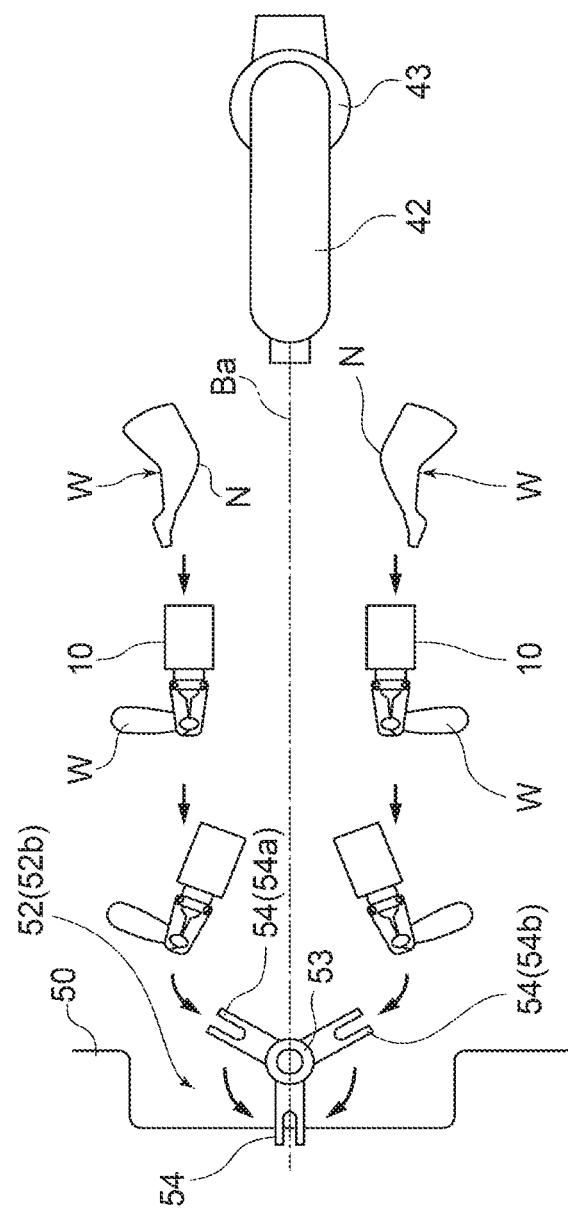
FIG. 8 is an explanatory view showing a loading operation to a loader portion of the loading device for the bone-in limb meat according to an embodiment.
Figure 9:
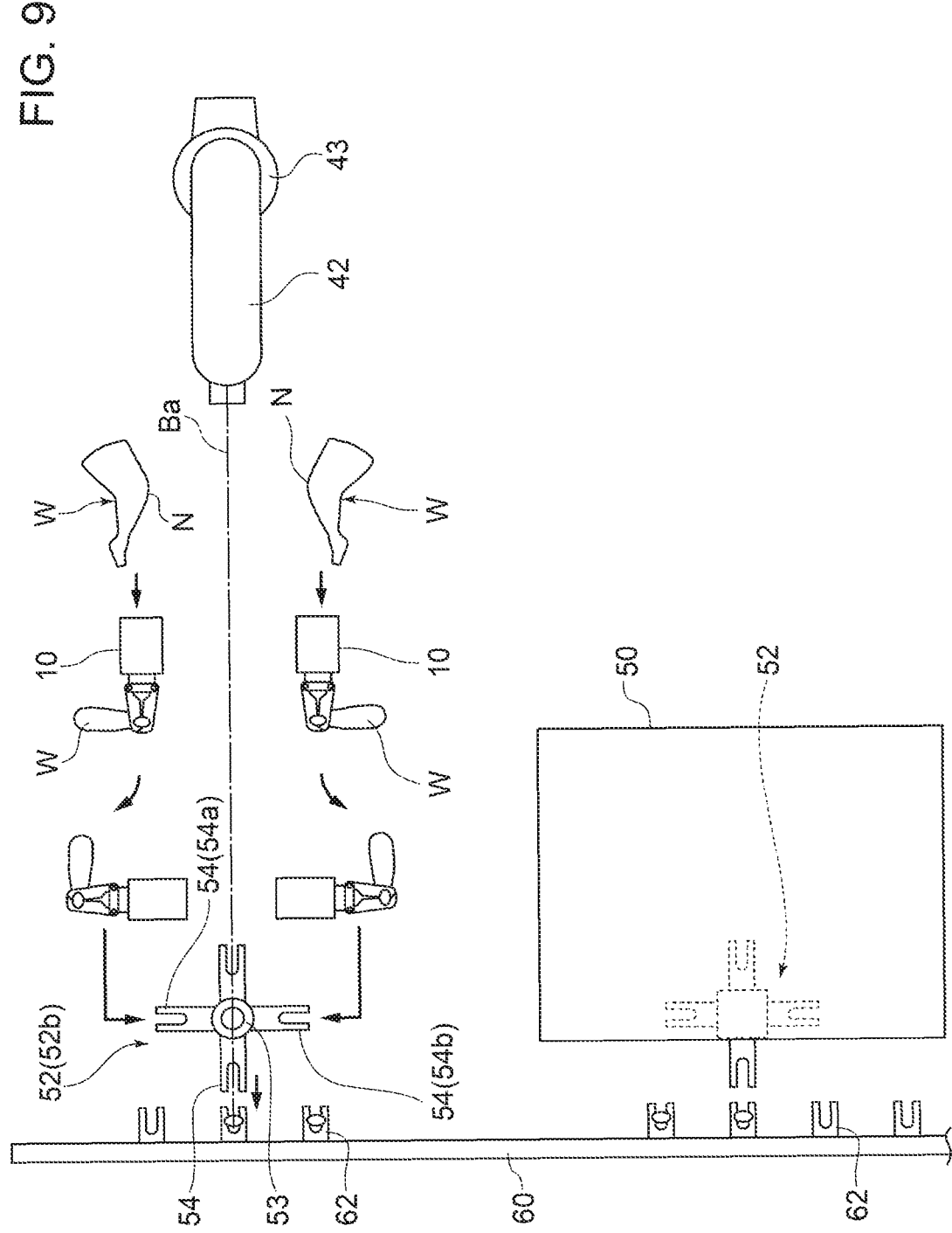
FIG. 9 is an explanatory view showing a loading operation to the loader portion of the loading device for the bone-in limb meat according to an embodiment.
Figure 10:
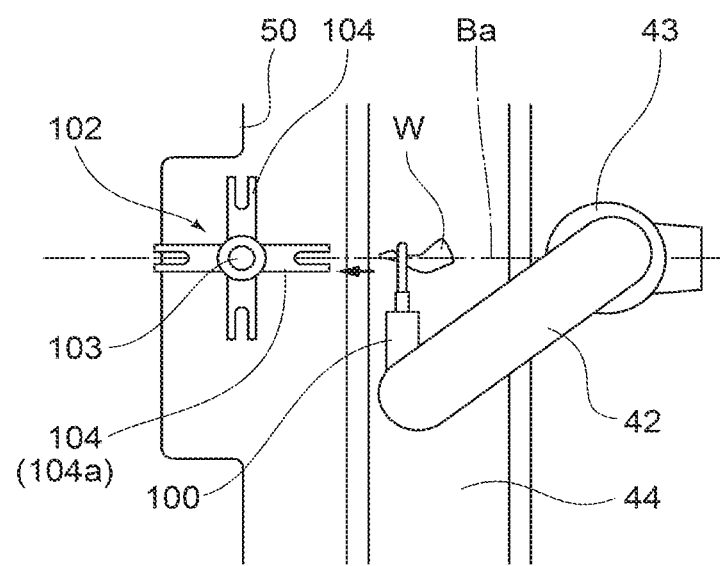
FIG. 10 is an explanatory view showing a loading operation to a loader portion of a loading device for a bone-in limb meat, which is a comparative example.

An embodiment shown in each of FIGS. 8 and 9 describes the operations of the arm 42 and clamping devices 10 by the control portion 48 when the clamping devices 10 suspend the bone-in limb meats W from the work placement surface Pm to the hangers 54. FIG. 10 shows operations of an arm 42 and clamping device 10, which is a comparative example.

In an embodiment, as shown in FIGS. 8 and 9, the control portion 48 is configured to perform control so as to suspend the bone-in limb meat W from the clamping device 10 to the hanger 54 on one side with respect to a reference line Ba which connects the rotatable shaft 53 and the support portion 43 rotatably supporting the arm 42 when the determination portion 46 determines that the upper surface of each bone-in limb meat W is the front surface, and suspend the bone-in limb meat W from the clamping device 10 to the hanger 54 on the other side with respect to the reference line Ba when the determination portion 46 determines that the upper surface of the bone-in limb meat W is the back surface.

In the loader portion 52 (52a) shown in FIG. 8, the three hangers 54 are mounted to the rotatable shaft 53 at regular intervals of 120°. In the loader portion 52 (52b) shown in FIG. 9, the four hangers 54 are mounted to the rotatable shaft 53 at regular angular intervals of 90°. For example, when the upper surface of the bone-in limb meat W is the front surface, the clamping device 10 holds the bone-in limb meat W and suspends it to the hanger 54 (54a) on the right side of the reference line Ba when viewed from the side of the arm 42, and when the upper surface of the bone-in limb meat W is the back surface, the clamping device 10 holds the bone-in limb meat W and suspends it to the hanger 54 (54b) on the left side of the reference line Ba when viewed from the side of the arm 42.

In this way it is possible to simplify the operations of the arm 42 and clamping devices 10, and thus to increase the suspension speed to the hangers 54 or the loading speed to the processing portion 50. That is, it is possible to suspend the bone-in limb meats W to the hangers 54 without significantly changing the angle of the arm 42 with respect to the reference line Ba and the angle of the clamp pieces 12 with respect to the arm 42. As shown in FIGS. 8 and 9, each of the bone-in limb meats W has different directions of the knee part N depending on whether the upper surface is the front surface or the back surface. The difference directions of the knee part N can be canceled by suspending the bone-in limb meats W to the hangers 54 at different positions across the reference line Ba, making it possible to simplify the movements of the arm 42 and clamping devices 10.

For example, in the loader portion 52 (52a) shown in FIG. 8, it is possible to suspend the bone-in limb meats to the hangers 54 just by inclining the clamping devices 10 by 30° with respect to the reference line Ba. In the embodiment shown in FIG. 9, it is possible to suspend the bone-in limb meats to the hangers 54 just by inclining the clamping devices 10 by 90° with respect to the reference line Ba. In addition, when loading the bone-in limb meat W suspended to each hanger 54 to the processing portion 50, the hanger 54 only need to be rotated by 120° in FIG. 8 and 90° in the loader portion 52 (52b) shown in FIG. 9, making it possible to reduce a rotation time of the hanger 54. It is therefore possible to increase the suspension speed and the loading speed, and increase a processing amount. In order to obtain the above rotation angles, the control portion 48 needs to perform control to rotate the hanger 54 (54a) forward and rotate the hanger 54 (54b) backward.

In contrast, in the comparative example shown in FIG. 10, a rotatable shaft 103 of a loader portion 102 is disposed on a reference line Ba and, for example, two or four hangers 104 are equiangularly disposed on the rotatable shaft 103. A clamping device 100 always suspends a bone-in limb meat W to a front hanger 104 (104a) (on the side of the arm 42) which is positioned on the reference line Ba without a distinction of whether the upper surface of the bone-in limb meat W is the front surface or the back surface. At this time, as shown in FIG. 10, it is necessary to significantly change the angle of the arm 42 with respect to the reference line Ba and the angle of the clamping device 100 with respect to the arm 42. In addition, when loading the bone-in limb meat W suspended to each hanger 104 to a processing portion 50, it is necessary to rotate the hanger 104 by 180° from a suspension position. Therefore, as compared with the above embodiment, a suspension speed and loading speed per bone-in limb meat may increase.

In the embodiment shown in FIG. 8, the loader portion 52 (52a) is disposed between the clamping devices 10 and the processing portion 50, and the bone-in limb meats W suspended to the loader portion 52 (52a) are loaded to the processing portion 50. In the embodiment shown in FIG. 9, the bone-in limb meats W suspended to the loader portion 52 (52b) are suspended to a plurality of hangers 62 moving by a conveyor 60. For example, when the recess portion 56 of each hanger 54 and the recess portion 56 of a corresponding one of the hangers 62 face each other, the bone-in limb meat W is pushed by a pusher (not shown) or the like, thereby suspending it to the hanger 62. The hanger 62 to which the bone-in limb meat W is suspended moves to the processing portion 50, and the bone-in limb meat W is loaded to the processing portion 50 via the loader portion 52 of the processing portion 50. As described above, the loader portion 52 may be used to displace the bone-in limb meats W from the clamping devices 10 to the plurality of hangers disposed to the conveyor.

A clamping method for the bone-in limb meat W according to an embodiment is a clamping method for the bone-in limb meat W by using the clamping device 10. That is, as described above, the clamping device 10 at least includes the pair of clamp pieces 12 (12a and 12b) for holding the bone-in limb meat W, the support portion 14 openably/closably supporting the pair of clamp pieces 12 in the base portion of each clamp piece, and rotation suppressing portions 16 for suppressing the rotation of the bone-in limb meat W, the rotation suppressing portions being respectively disposed so as to protrude from the surfaces of the pair of clamp pieces 12 along a direction perpendicular to the plane including the opening/closing directions of the pair of clamp pieces 12. Furthermore, in the opened state, the pair of clamp pieces 12 respectively have the tip portions 18 (18a and 18b) at the positions closer to the center line C than the rotation suppressing portions 16 and the positions farther away from the support portion 14 than the rotation suppressing portions 16 (tip side) in the direction along the center line C.

Figure 11:
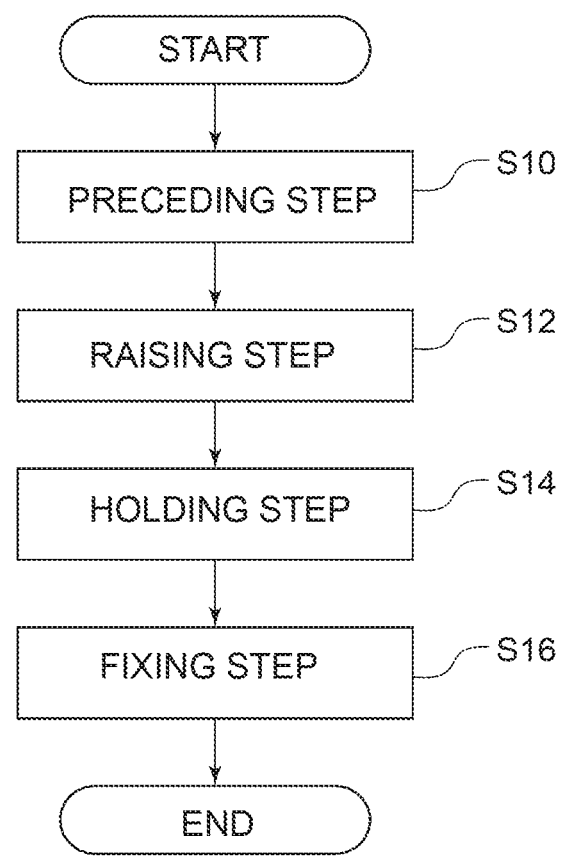
FIG. 11 is a flowchart of a clamping method for the bone-in limb meat according to an embodiment.

As shown in FIG. 11, this clamping method first closes the pair of clamp pieces 12 and inserts the tip portions 18 (18a and 18b) below the clamping section (limb neck part) of the bone-in limb meat W, thereby picking up the clamping section (preceding step S10). That is, in the preceding step S10, the tip portions 18 first touch the clamping section and raises the clamping section. Next, the pair of clamp pieces 12 hold and transport the clamping section (holding step S14). In an early stage of this holding step S14, the rotation suppressing portions 16 support the clamping section picked up by the tip portions 18 (raising step S12). Thus it is possible to securely perform the holding operation by the clamp pieces 12.

According to the above method, it is possible to securely hold the clamping section by the pair of clamp pieces 12 by performing the preceding step S10 before the holding step S14, which makes it possible to accelerate the holding operation of the pair of clamp pieces 12, and thus to increase the suspension speed to the hangers 54 or the loading speed to the processing portion 50.

In an embodiment, as described above, the rotation suppressing portion 16 is disposed to each of the pair of clamp pieces 12 and includes the contact piece 30 extending toward the side of the center line C. When the bone-in limb meat W is the poultry bone-in thigh meat, the depression d exists in the longitudinal direction of the limb neck part. Accordingly, with respect to the bone-in limb meat W held in the holding step S14, at least one of the contact pieces 30 is inserted into the depression d (fixing step S16).

According to this embodiment, the contact piece 30 is inserted into the depression d simultaneously when the bone-in limb meat W is held by the pair of clamp pieces 12, making it possible to suppress the rotation and wobble in the held bone-in limb meat W, and keep a holding orientation.

The bone-in limb meats W include general bone-in limb meats of the front limbs, back limbs, and the like of livestock such as not only poultry but also a pig, cattle, and sheep.

INDUSTRIAL APPLICABILITY

According to an embodiment, when holding a bone-in limb meat by a clamping device, it possible to securely hold the bone-in limb meat, and thus to increase a holding speed. It is also possible to automate, by a machine without manpower, a work to load or suspend bone-in limb meats in the same direction when suspending the bone-in limb meats to a plurality of hangers or when loading a plurality of bone-in limb meats to a processing device such as a deboner.

REFERENCE SIGNS LIST 10, 100 Clamping device
12 (12a, 12b) Clamp piece
14, 43 Support portion
16 Rotation suppressing portion
18 (18a, 18b) Tip portion
20 Actuator
22 Inlet/outlet port
24, 26 Shaft
28 Mounting plate
30 Contact piece
32 Wall portion 32 (32a) First wall portion
32 (32b) Second wall portion
32 (32c) Third wall portion
40 Loading device
42 Arm
44, 60 Conveyor
46 Determination portion
48 Control portion
50 Processing portion 50
52 (52a, 52b), 102 Loader portion
53, 103 Rotatable shaft
54 (54a, 54b), 62, 104 hanger
56 Recess portion
Ba Reference line
C Center line
N Knee part
Pm Work placement surface
W Bone-in limb meat
d Depression
f Limb neck part
t Thigh section
$\alpha_2$, $\alpha_3$ Inclination angle

The invention claimed is:

1. A clamping device for a bone-in limb meat, the device comprising:
   a pair of clamp pieces for holding the bone-in limb meat;
   a support portion openably/closably supporting the pair of clamp pieces at respective base portions of the clamp pieces; and
   rotation suppressing portions for suppressing a rotation of the bone-in limb meat, the rotation suppressing portions being respectively disposed so as to protrude from surfaces of the pair of clamp pieces along a direction perpendicular to a plane including opening/closing directions of the pair of clamp pieces,
   wherein in an opened state of the pair of clamp pieces, the pair of clamp pieces respectively have tip portions at positions closer to a center line between the pair of clamp pieces than the rotation suppressing portions and positions farther away from the support portion than the rotation suppressing portions in a direction along the center line.

2. The clamping device for the bone-in limb meat according to claim 1,
   wherein the rotation suppressing portions are respectively disposed to the pair of clamp pieces and respectively include contact pieces extending toward a side of the center line, and
   wherein the contact pieces are configured to contact the bone-in limb meat in a closed state of the pair of clamp pieces.

3. The clamping device for the bone-in limb meat according to claim 2,
   wherein each of the contact pieces is configured to have a plate-shape body extending along a direction intersecting with the plane.

4. The clamping device for the bone-in limb meat according to claim 1,
   wherein the rotation suppressing portions include wall portions disposed to the pair of clamp pieces respectively so as to face each other across a space between the pair of clamp pieces, and
   wherein in the opened state, the tip portions of the clamp pieces are respectively positioned closer to the center line than the wall portions and respectively positioned farther away from the support portion than the wall portions in the direction along the center line.

5. The clamping device for the bone-in limb meat according to claim 4,
   wherein each of the wall portions at least partially extends along an outline on a far side of a corresponding one of the clamp pieces from the center line.

6. The clamping device for the bone-in limb meat according to claim 4,
   wherein each of the wall portions includes:
   a first wall portion extending along the center line in a closed state of the pair of clamp pieces;
   a second wall portion connected to an end portion of the first wall portion on a side of the support portion, and bending and extending from the first wall portion toward the center line; and
   a third wall portion connected to an opposite end portion of the first wall portion against the support portion, and bending and extending from the first wall portion toward the center line.

7. The clamping device for the bone-in limb meat according to claim 6,
   wherein the second wall portion and the third wall portion are inclined with respect to the center line in the closed state of the pair of clamp pieces, and an inclination angle of the third wall portion with respect to the center line is smaller than an inclination angle of the second wall portion with respect to the center line.

8. The clamping device for the bone-in limb meat according to claim 1,
   wherein the tip portions of the respective clamp pieces are configured to overlap each other when viewed from a direction perpendicular to the plane in a closed state of the pair of clamp pieces.

9. A loading device for loading a bone-in limb meat to a processing portion, the device comprising:
   the clamping device for the bone-in limb meat according to claim 1; and
   an arm supporting the support portion and capable of controlling an operation of the clamping device,
   wherein the bone-in limb meat held by the clamping device for the bone-in limb meat is loaded to the processing portion.

10. The loading device for the bone-in limb meat according to claim 9, further comprising:
    a conveyor conveying the bone-in limb meat to the clamping device for the bone-in limb meat;
    a determination portion capable of acquiring orientation information of the bone-in limb meat conveyed by the conveyor; and
    a control portion operating the arm based on the orientation information acquired by the determination portion and loading the bone-in limb meat to the processing portion in a predetermined direction.

11. The loading device for the bone-in limb meat according to claim 10,
    wherein the orientation information includes front/back surface information indicating whether an upper surface of the bone-in limb meat placed on the conveyor is a front surface or a back surface, and
    wherein the control portion is configured to control an operation of the arm based on the orientation information and the front/back surface information, and load the bone-in limb meat to the processing portion such that one of the front surface or back surface always faces the same direction with respect to the processing portion.

12. The loading device for the bone-in limb meat according to claim 10, further comprising a loader portion receiving the bone-in limb meat from the clamping device for the bone-in limb meat and passing the bone-in limb meat to the processing portion, wherein the loader portion includes a rotatable shaft and three or more hangers being rotatable about the rotatable shaft and disposed with an equal angular difference with respect to the rotatable shaft.

13. The loading device for the bone-in limb meat according to claim 12, wherein the control portion is configured to control the loader portion to suspend the bone-in limb meat from the clamping device to the hanger on a first side with respect to a reference line when the determination portion determines the upper surface of the bone-in limb meat is the front surface, the reference line connecting the rotatable shaft and a support portion rotatably supporting the arm, and suspend the bone-in limb meat from the clamping device to the hanger on a second side with respect to the center line when the determination portion determines the upper surface of the bone-in limb meat is the back surface.

14. A clamping method for holding a bone-in limb meat by using a clamping device, the clamping device including: a pair of clamp pieces for holding the bone-in limb meat; a support portion openably/closably supporting the pair of clamp pieces at respective base portions of the clamp pieces; and rotation suppressing portions for suppressing a rotation of the bone-in limb meat, the rotation suppressing portions being respectively disposed so as to protrude from surfaces of the pair of clamp pieces along a direction perpendicular to a plane including opening/closing directions of the pair of clamp pieces, wherein in an opened state of the pair of clamp pieces, the pair of clamp pieces respectively have tip portions at positions closer to a center line between the pair of clamp pieces than the rotation suppressing portions and positions farther away from the support portion than the rotation suppressing portions in a direction along the center line, the method comprising:

a preceding step of closing the pair of clamp pieces and inserting the tip portions of the pair of clamp pieces below a clamping section of the bone-in limb meat, thereby picking up the clamping section; and a holding step of holding and transporting the clamping section by the pair of clamp pieces.

15. The clamping method for the bone-in limb meat according to claim 14, wherein the rotation suppressing portion is disposed to each of the pair of clamp pieces and includes a contact piece extending toward the side of the center line, and wherein in the holding step, one of the contact pieces is inserted into a depression of the bone-in limb meat.

* * * * *